(12) United States Patent
Ogata (10) Patent No.: US 12,475,551 B2
(45) Date of Patent: Nov. 18, 2025

(54) MANUFACTURING APPARATUS OF SEMICONDUCTOR DEVICE AND MANUFACTURING METHOD OF SEMICONDUCTOR DEVICE

(71) Applicant: Yamaha Robotics Co., Ltd., Tokyo (JP)

(72) Inventor: Yoshiyuki Ogata, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 30 days.

(21) Appl. No.: 17/919,522

(22) PCT Filed: Apr. 27, 2021

(86) PCT No.: PCT/JP2021/016763
§ 371 (c)(1),
(2) Date: Jan. 4, 2024

(87) PCT Pub. No.: WO2022/230043
PCT Pub. Date: Nov. 3, 2022

(65) Prior Publication Data
US 2024/0127423 A1    Apr. 18, 2024

(51) Int. Cl.
*G06T 7/00* (2017.01)
*G06T 7/73* (2017.01)
*H01L 23/00* (2006.01)

(52) U.S. Cl.
CPC ............... *G06T 7/001* (2013.01); *G06T 7/74* (2017.01); *H01L 24/743* (2013.01); *G06T 2207/30148* (2013.01); *H01L 2224/743* (2013.01)

(58) Field of Classification Search
CPC . G06T 7/001; G06T 7/74; G06T 2207/30148; H01L 24/743;
(Continued)

(56) References Cited

U.S. PATENT DOCUMENTS 10,596,700 B2   3/2020   Corkum et al.
11,469,125 B2   10/2022  Seyama et al.
(Continued)

FOREIGN PATENT DOCUMENTS

CN   107932012    4/2020
JP   2003249800   9/2003
(Continued)

OTHER PUBLICATIONS

"Office Action of Taiwan Counterpart Application", issued on Nov. 27, 2023, with partial English translation thereof, p. 1-p. 10.
(Continued)

*Primary Examiner* — Nasim N Nirjhar
(74) *Attorney, Agent, or Firm* — JCIPRNET (57) ABSTRACT

A manufacturing apparatus of a semiconductor device includes: multiple processing heads provided apart from each other in order to perform predetermined processing in different positions on a common lead frame, the processing heads respectively including cameras; and a controller controlling driving of the processing heads, the controller positioning each of the processing heads at a position where at least an optical offset is canceled out. The controller takes an image of a paste of one island by the cameras and acquires optical inspection images respectively corresponding to the processing heads before the positioning, and calculates, as the optical offset, an amount of difference between the processing heads in a relative positional relationship between the island and the paste shown in the optical inspection images.

6 Claims, 9 Drawing Sheets (58) Field of Classification Search
CPC ... H01L 2224/743; H01L 21/50; H01L 21/52; H01L 21/60; H01L 23/00; H01L 2021/60015; H01L 2021/6003
See application file for complete search history.

(56) References Cited

U.S. PATENT DOCUMENTS

| | | | |
|---|---|---|---|
| 2017/0148759 A1* | 5/2017 | Hayata | H01L 24/83 |
| 2020/0279762 A1* | 9/2020 | Seyama | H05K 13/04 |

FOREIGN PATENT DOCUMENTS

| | | | | |
|---|---|---|---|---|
| JP | 2003249800 A | * | 9/2003 | |
| JP | 2005109392 | | 4/2005 | |
| JP | 4029855 | | 1/2008 | |
| WO | 2019044816 | | 3/2019 | |
| WO | WO-2019044816 A1 | * | 3/2019 | G05B 19/19 |

OTHER PUBLICATIONS

"International Search Report (Form PCT/ISA/210) of PCT/JP2021/016763," mailed on Jul. 20, 2021, pp. 1-3.
"Office Action of China Counterpart Application", issued on Aug. 13, 2025, with English translation thereof, p. 1-p. 28.

* cited by examiner

MANUFACTURING APPARATUS OF SEMICONDUCTOR DEVICE AND MANUFACTURING METHOD OF SEMICONDUCTOR DEVICE

CROSS-REFERENCE TO RELATED APPLICATION

This application is a 371 application of the International PCT application serial no. PCT/JP2021/016763, filed on Apr. 27, 2021. The above-mentioned patent application is hereby incorporated by reference herein and made a part of this specification.

TECHNICAL FIELD

The present specification discloses a manufacturing apparatus of a semiconductor device and a manufacturing method of a semiconductor device, in which multiple processing heads performing predetermined processing are provided in different positions on a common substrate.

RELATED ART

In general, a semiconductor manufacturing apparatus includes a processing head performing predetermined processing such as paste coating or chip bonding on a substrate. When the predetermined processing is executed, it is required that the processing head be accurately positioned with respect to the substrate. In order to enable such positioning, there has been conventionally known a technique in which a camera taking an image of the substrate is provided on the processing head, and a position of the processing head with respect to the substrate is grasped based on the image obtained by the camera (for example, see Patent Document 1 or the like).

PRIOR-ART DOCUMENTS

Patent Documents

Patent Document 1: Japanese Patent No. 4029855

SUMMARY OF THE INVENTION

Problems to be Solved by the Invention

By the way, in recent years, in order to shorten the lead time, there has also been proposed a manufacturing apparatus in which multiple processing heads execute predetermined processing concurrently on one substrate. According to such a manufacturing apparatus, the processing time for one substrate can be significantly shortened as compared with the case of a single head. In such a configuration with multiple heads, each processing head includes a camera for positioning, and is positioned based on an image obtained by the camera.

Here, in the camera, due to individual differences between lenses or imaging elements, or inclination of an optical axis of the camera or the like, distortion occurs in the image obtained. Hence, even if an image is taken of the same area from the same position, the image obtained may differ depending on the camera. Due to such image distortion that differs for each camera, variation occurs in the positioning between the processing heads. As a result, the arrangement of a processing object (such as a paste or a chip) mounted on one substrate may become uneven, leading to deterioration in quality of a semiconductor device.

Therefore, the present specification discloses a manufacturing apparatus of a semiconductor device and a manufacturing method of a semiconductor device which are capable of further improving the quality of a semiconductor device.

Means for Solving the Problems

A manufacturing apparatus of a semiconductor device as disclosed in the present specification is characterized as follows. The manufacturing apparatus includes: multiple processing heads provided apart from each other in order to perform predetermined processing in different positions on a common substrate, in which each of the processing heads includes a camera taking an image of the substrate; and a controller controlling driving of the processing heads and conveyance of the substrate, in which the controller positions each of the processing heads with respect to the substrate at a position where at least an optical offset is canceled out. The controller, before the positioning, takes an image of one optical inspection part including a reference and an object located apart from the reference by the camera of each of the processing heads and acquires an optical inspection image corresponding to each of the processing heads. The controller calculates, as the optical offset, an amount of difference between the processing heads in a relative positional relationship between the reference and the object shown in the optical inspection image.

In this case, the predetermined processing may include processing for mounting the object on the substrate. The reference may be a shape feature of a surface of the substrate. The controller may, before acquisition of the optical inspection image, cause one of the processing heads to execute the predetermined processing on a portion of the substrate. The controller may cause an image to be taken of a part of the substrate where the object is mounted by the predetermined processing as the optical inspection part by the camera of each of the processing heads.

In the positioning, the controller may position each of the processing heads at a position where the optical offset and a machine offset are canceled out. Before the positioning, the controller may cause each of the processing heads to execute the predetermined processing in a corresponding area on the substrate, the controller may take an image of the corresponding area on the substrate by the camera of each of the processing heads and acquire a mechanical inspection image corresponding to each of the processing heads, and the controller may calculate the machine offset for each of the processing heads based on a relative positional relationship between the reference and the object shown in the mechanical inspection image.

The predetermined processing may be processing for coating a paste as the object on the substrate.

A manufacturing method of a semiconductor device as disclosed in the present specification is characterized as follows. The manufacturing method includes the following steps. An optical offset corresponding to each of multiple processing heads provided apart from each other in order to perform predetermined processing in different positions on a common substrate is acquired. Each of the processing heads is positioned with respect to the substrate at a position where at least an optical offset is canceled out, and each of the processing heads executes the predetermined processing in a corresponding position on the substrate. The acquiring includes the following steps. An image of one optical inspection part including a reference and an object located apart from the reference is taken by a camera provided on each of the processing heads and an optical inspection image corresponding to each of the processing heads is acquired. An amount of difference between the processing heads in a relative positional relationship between the reference and the object shown in the optical inspection image is calculated as the optical offset.

Effects of the Invention

According to the technique disclosed in the present specification, since the optical offset is acquired and the processing head is positioned at a position where the optical offset is canceled out, variation in the position of a processing object within the substrate is reduced. As a result, the quality of a semiconductor device can further be improved.

DESCRIPTION OF THE EMBODIMENTS

Figure 1:
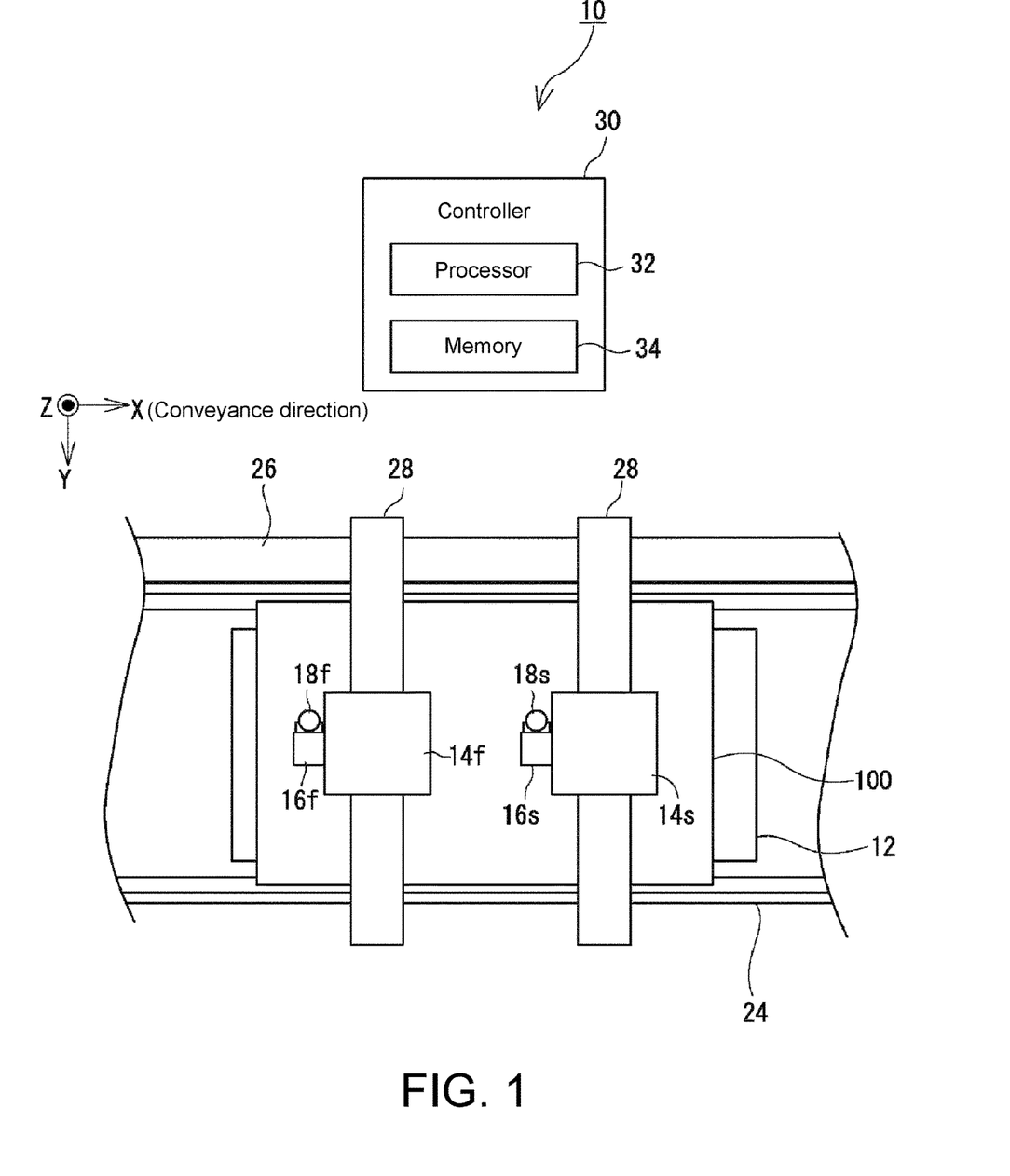
FIG. 1 is a diagram showing a configuration of a manufacturing apparatus.
Figure 2:
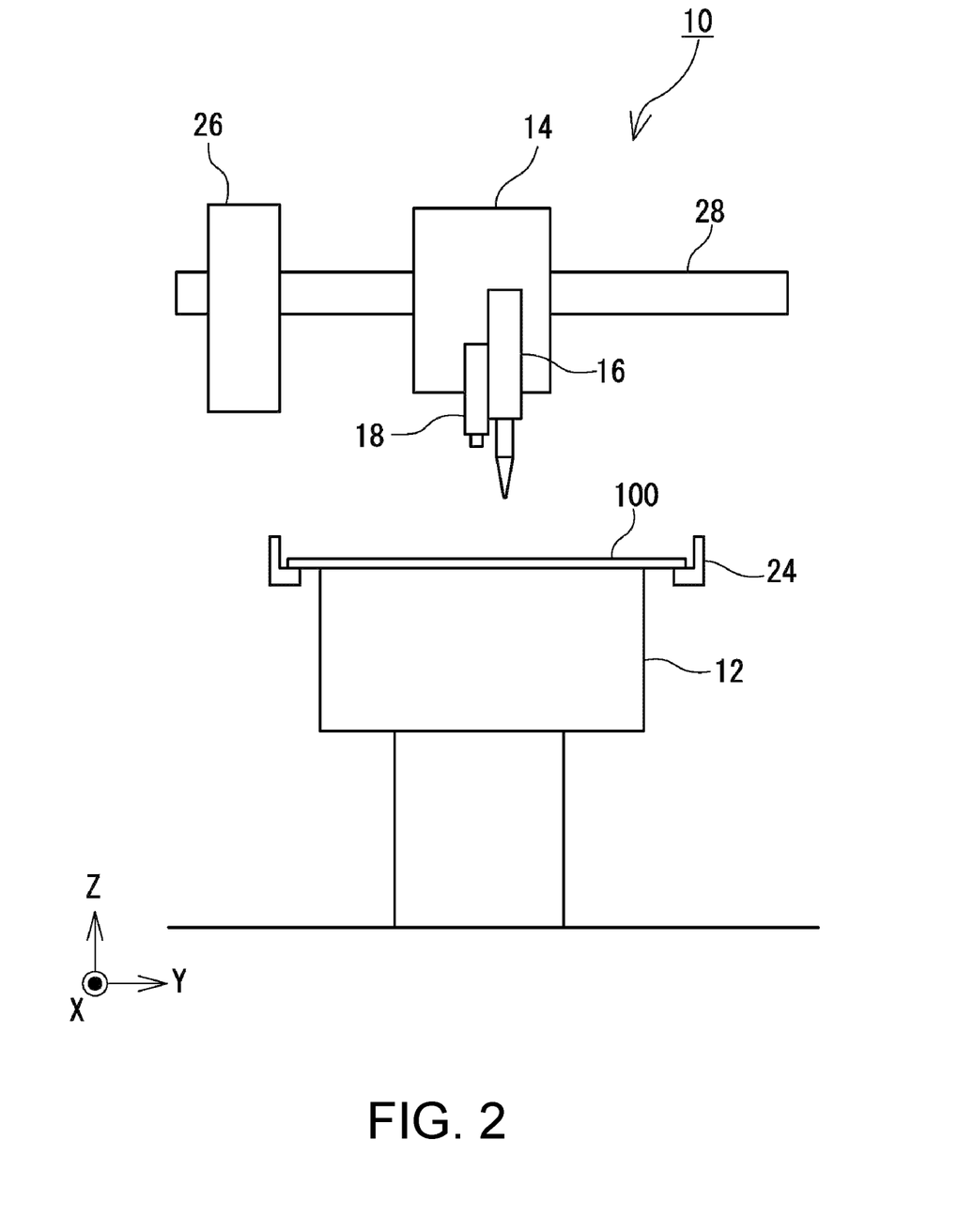
FIG. 2 is a schematic side view of a manufacturing apparatus.

Hereinafter, a manufacturing apparatus 10 of a semiconductor device is described with reference to the drawings. FIG. 1 is a diagram showing a configuration of the manufacturing apparatus 10. FIG. 2 is a schematic side view of the manufacturing apparatus 10. The manufacturing apparatus 10 is used for mounting a semiconductor chip on a lead frame 100 being a substrate and manufacturing a semiconductor device. More specifically, the manufacturing apparatus 10 is a paste coater coating the lead frame 100 with a paste for fixing the semiconductor chip.

The manufacturing apparatus 10 includes a stage 12 sucking and fixing the lead frame 100, a first processing head 14f and a second processing head 14s, a conveyance rail 24 conveying the lead frame 100 in an X direction, and a controller 30 controlling driving of the above components. Here, the first processing head 14f and the second processing head 14s have almost the same configuration. Hence, in the following description, where no distinction is made between the first processing head 14f and the second processing head 14s, the subscripts f and s are omitted and they are simply referred to as "processing head 14". The same applies to dispenser 16 and camera 18 which will be described later.

As shown in FIG. 1, the first processing head 14f and the second processing head 14s are disposed spaced apart in the X direction (that is, conveyance direction of the lead frame 100). Each processing head 14 is freely movable in the X and Y directions by an X guide 26 and a Y guide 28. The first processing head 14f and the second processing head 14s are movable independently of each other.

The processing head 14 includes the dispenser 16 and the camera 18. The dispenser 16 discharges to the lead frame 100 a paste P for chip fixing, such as for example, a non-conductive paste (NCP). The dispenser 16 can be lifted and lowered in a Z direction by a lifting mechanism (not shown). The configuration of the dispenser 16 is not particularly limited as long as the dispenser 16 is capable of discharging a specified amount of the paste P as needed. Therefore, the dispenser 16 may include, for example, a syringe storing the paste P, a piston capable of advancing and retreating in the syringe, and a motor causing the piston to move straight on.

The camera 18 is disposed apart from the dispenser 16 in the X and Y directions, and its horizontal position relative to the dispenser 16 is fixed. In the following, a design value (xs, ys) of an offset of the camera 18 with respect to the dispenser 16 is referred to as "basic offset OSs".

The camera 18 has a vertically downward optical axis and takes an image of the lead frame 100. Specifically, on the lead frame 100, multiple islands being sections for paste coating are set in a two-dimensional matrix. The camera 18 takes an image of the island. The camera 18 transmits the image taken of the island (that is, the lead frame 100) to the controller 30. Based on the image taken, the controller 30 calculates a relative positional relationship between the processing head 14 and the lead frame 100, and positions the processing head 14 based on a result of the calculation.

The controller 30 controls driving of the stage 12, the conveyance rail 24, and the processing head 14. The controller 30 also calculates a position correction value for correcting a target position of the processing head 14, which will be described later. The controller 30 like this is physically a computer having a processor 32 and a memory 34.

Figure 3:
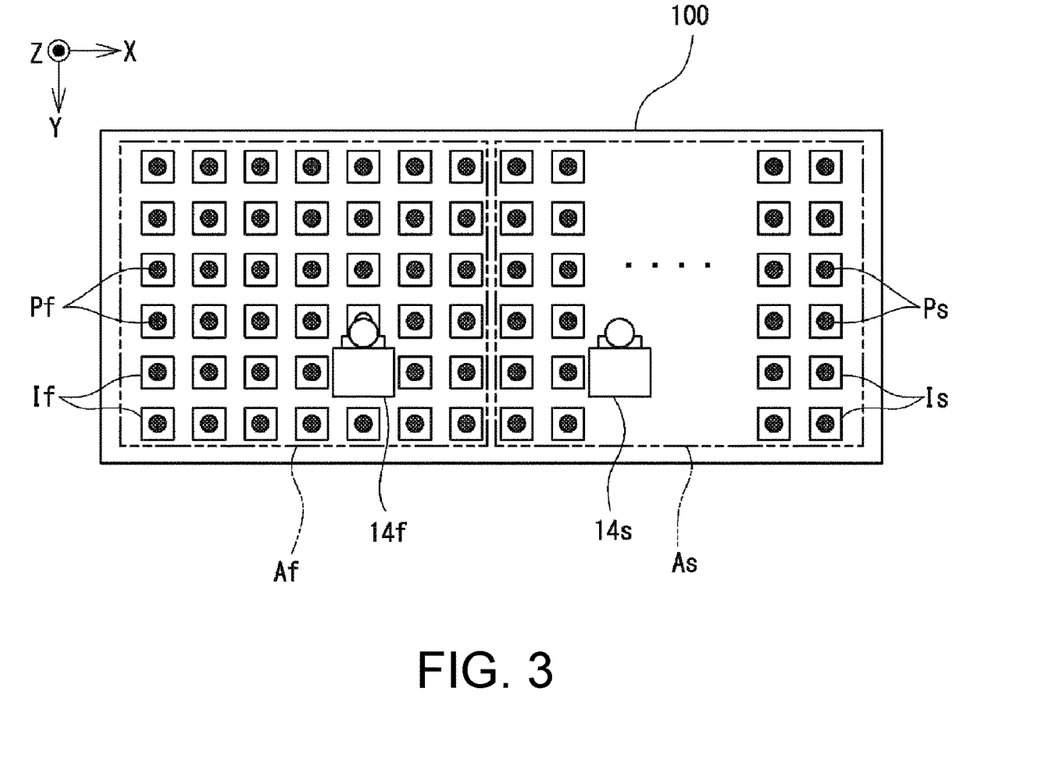
FIG. 3 is a conceptual diagram showing a state of a lead frame in which paste coating processing is completed.

Next, paste coating processing performed by the manufacturing apparatus 10 like this is described with reference to FIG. 3. FIG. 3 is a conceptual diagram showing a state of the lead frame 100 in which the paste coating processing is completed. As shown in FIG. 3, in the manufacturing apparatus 10 of this example, one lead frame 100 is managed by being divided into two in the conveyance direction. That is, the controller 30 divides the lead frame 100 into a first area Af located upstream in the conveyance direction and a second area As located downstream of the first area Af in the conveyance direction, and manages the lead frame 100.

In the following, an island provided in the first area Af is referred to as "island If", and an island provided in the second area As is referred to as "island Is". Similarly, a paste coated on the island If is referred to as "paste Pf", and a paste coated on the island Is is referred to as "paste Ps". Where no distinction is made between the areas, the subscripts f and s are omitted and the areas, islands and pastes are simply referred to as "area A", "island I", and "paste P".

The first processing head 14f coats the paste Pf on the island Is in the first area Af on the lead frame 100. Similarly, the second processing head 14s coats the paste Ps on the island Is in the second area As on the lead frame 100. In this way, by processing one lead frame 100 by using the two processing heads 14f and 14s concurrently, the lead time can be significantly reduced.

When the paste P is coated, the controller 30 causes an image to be taken of the island I by the camera 18. Based on the image taken, the controller 30 calculates a relative positional relationship between the dispenser 16 and the island I. Then, the controller 30 positions the processing head 14 so that the dispenser 16 is located in the target position. When the positioning is completed, the controller 30 drives the dispenser 16 to discharge a predetermined amount of the paste P to the island I. The controller 30 executes such processing on all the islands I.

Figure 4:
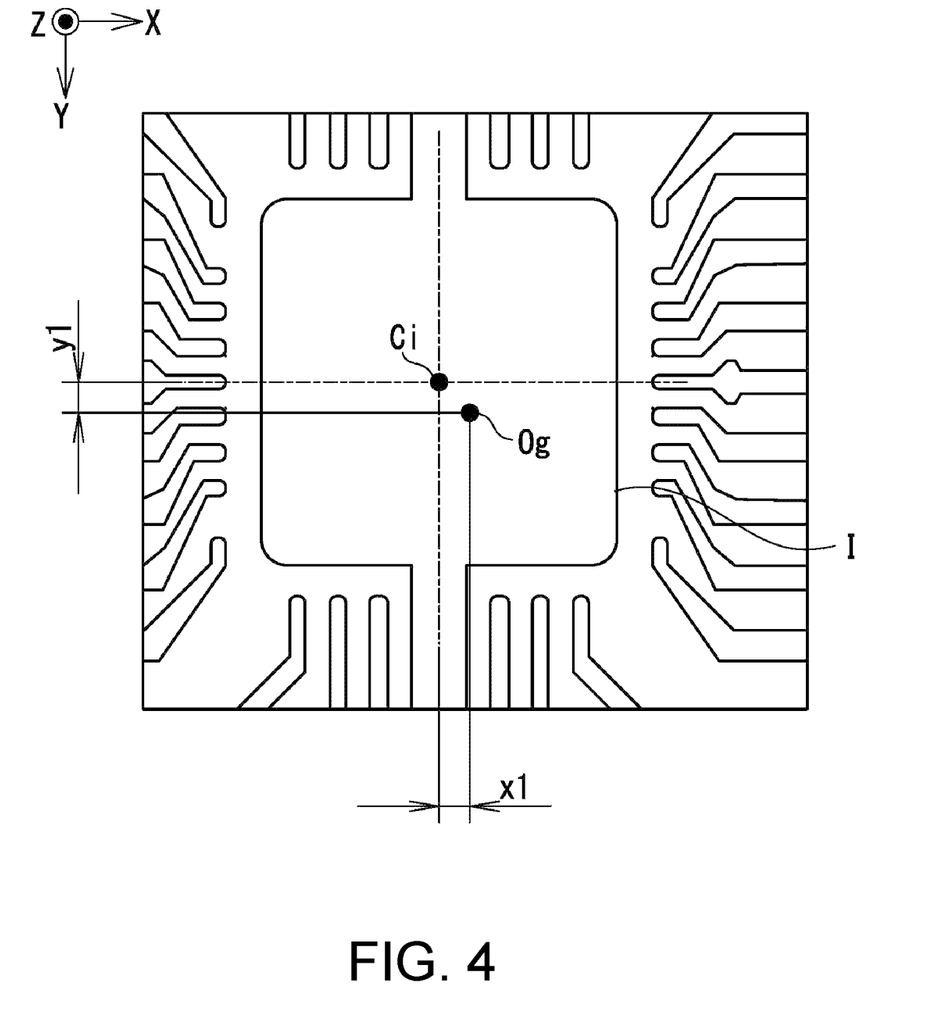
FIG. 4 is a diagram showing an example of an image taken by a camera.

As described above, when coating the paste P, it is necessary to position the processing head 14. The positioning processing of the processing head 14 is described. As described above, when the processing head 14 is positioned, the controller 30 takes an image of the lead frame 100 (specifically, the island I) by the camera 18. FIG. 4 is a diagram showing an example of an image taken by the camera 18.

As shown in FIG. 4, a substantially rectangular island I is shown in the image taken. This island I is used as a reference indicating a positioning standard. In this example, a center point (hereinafter referred to as "island center point Ci") of the island I is set as the target position for coating of the paste P.

In order to position the dispenser 16, the controller 30 specifies relative positions of the dispenser 16 and the island center point Ci based on the image taken. Specifically, based on the image taken, the controller 30 obtains an offset (x1, y1) of the island center point Ci with respect to an origin Og of the image taken. The offset (x1, y1) represents an offset of the optical axis of the camera 18 with respect to the island center point Ci. If the offset of the dispenser 16 with respect to the camera 18, that is, the basic offset OSs=(xs, ys), is added to the offset (x1, y1), a theoretical value of the offset of the dispenser 16 with respect to the island center point Ci can be specified.

However, the basic offset OSs is the design value of the offset of the camera 18 with respect to the dispenser 16. Hence, the actual offset of the camera 18 with respect to the dispenser 16 is often different from the basic offset OSs due to assembly errors or aging. In the following, an amount of error between the actual offset and the basic offset OSs is referred to as a machine offset OSm=(xm, ym). Due to a difference in optical characteristics between each camera 18, an optical offset OSo to be described later is present between the first processing head 14f and the second processing head 14s. Therefore, the controller 30 obtains the machine offset OSm and the optical offset OSo before the positioning of the processing head 14. Then, when the processing head 14 is positioned, a position where the offsets OSm and OSo are canceled out is set as the target position of the processing head 14.

Here, the machine offset OSm can be specified using a conventionally known method. For example, after the processing head 14 is positioned based on the basic offset OSs and the paste P is coated, an image may be taken of the island I coated with the paste P. Based on the image taken, a deviation amount of the paste P from the island center point Ci may be obtained, and the machine offset OSm may be obtained from the deviation amount.

Figure 5A:
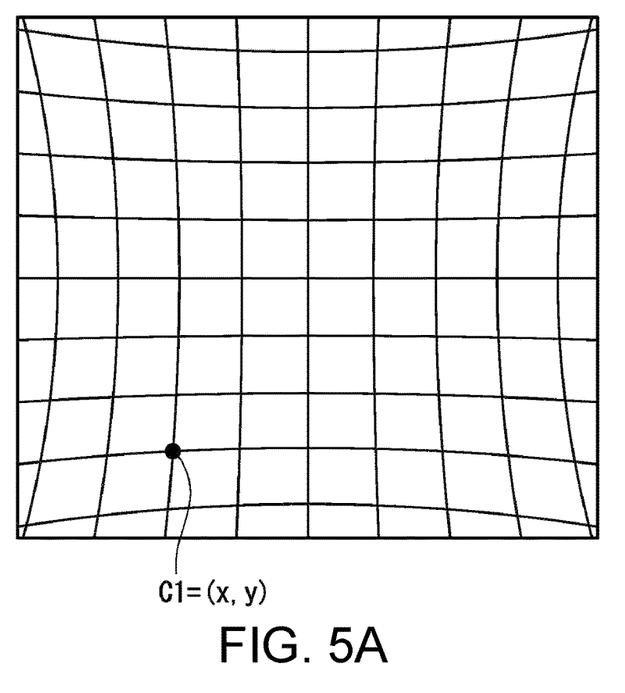
FIG. 5A is a diagram showing an example of taking an image of a lattice pattern.
Figure 5B:
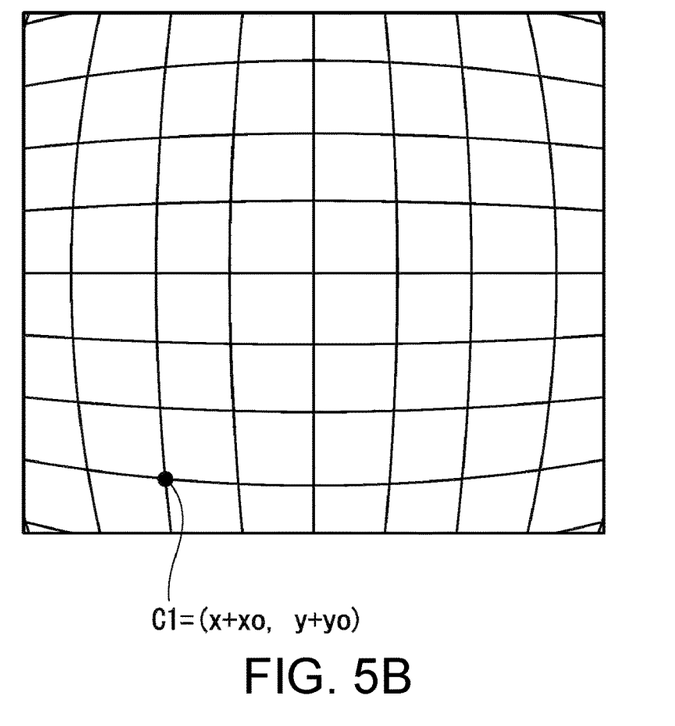
FIG. 5B is a diagram showing another example of taking an image of a lattice pattern.

Next, the optical offset OSo is described with reference to FIG. 5A and FIG. 5B. Regarding the camera 18, even the same product may differ in optical characteristics. The difference in optical characteristics is caused by, for example, individual differences between lenses or imaging elements, or a difference in inclination of the optical axis that occurs during assembly of the camera 18. Due to such variation in optical characteristics, even if an image is taken of the same object from the same position, the content of the image obtained may differ depending on the camera. For example, a case is considered of taking images of a specific lattice pattern by multiple cameras from a specific position. In this case, in one camera, an image may be obtained in which a central part contracts in a bobbin shape, as shown in FIG. 5A; in another camera, an image may be obtained in which the central part expands in a barrel shape, as shown in FIG. 5B. In the case of positioning based on an image taken without considering such image difference, a positioning error occurs between the cameras. For example, a coordinate position of an intersection point C1 of the lattices in the image taken is (x, y) in FIG. 5A and (x+xo, y+yo) in FIG. 5B. A positional deviation amount (xo, yo) due to such variation in optical characteristics of the camera is the optical offset OSo. If the optical offset OSo is not taken into consideration, the same position in reality may be calculated as different positions and a positioning error is caused.

Here, since such an optical offset OSo is the positional deviation amount between the cameras 18, it does not pose a big problem in the case of a single processing head 14, that is, the case where there is only one camera 18 for positioning. On the other hand, in the case where multiple processing heads 14 are provided and one lead frame 100 is processed by the multiple processing heads 14, the optical offset OSo may cause variation in positioning, posing a big problem.

Figure 6:
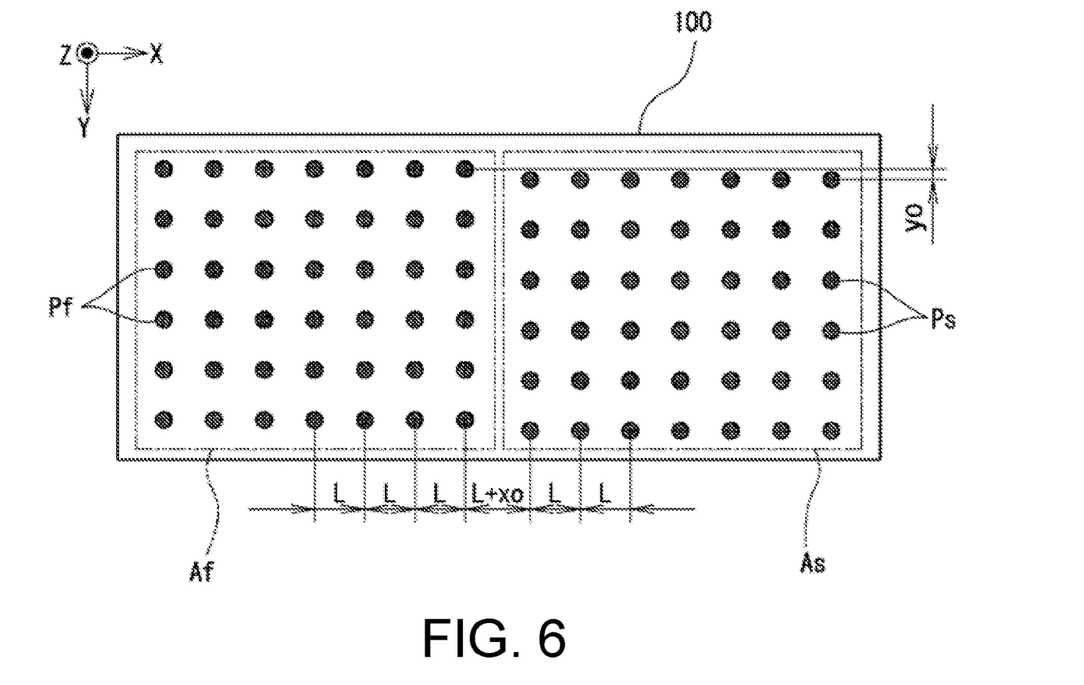
FIG. 6 is a diagram showing an example of a coating result obtained when a paste is coated without correction of an optical offset.

FIG. 6 is a diagram showing an example of a coating result obtained in the case where the optical offset OSo is not corrected in the first camera 18f and the second camera 18s. In FIG. 6, when the paste Pf is coated in the first area Af, the first dispenser 16f is positioned based on an image taken by the first camera 18f. Hence, if limited to the first area Af, since there is no variation in optical characteristics, a relative positional relationship between multiple pastes Pf coated in the first area Af is close to ideal. Similarly, a relative positional relationship between multiple pastes Ps coated in the second area As is also close to ideal. On the other hand, due to the variation in optical characteristics between the first camera 18f and the second camera 18s, an error corresponding to the optical offset OSo occurs in a relative positional relationship between the paste Pf and the paste Ps. For example, it is required that multiple pastes be arranged in a straight line in the X direction. However, in the example of FIG. 6, the paste Ps deviates from the paste Pf by yo. Similarly, in the case where multiple pastes are required to be coated at regular intervals of L in the X direction, an internal between the first area Af and the second area As in the X direction deviates by xo with respect to an ideal distance and becomes L+xo. As a result, when viewed as a whole of the lead frame 100, a coating position of the paste P varies, leading to deterioration in the quality of a semiconductor device finally manufactured.

Figure 7:
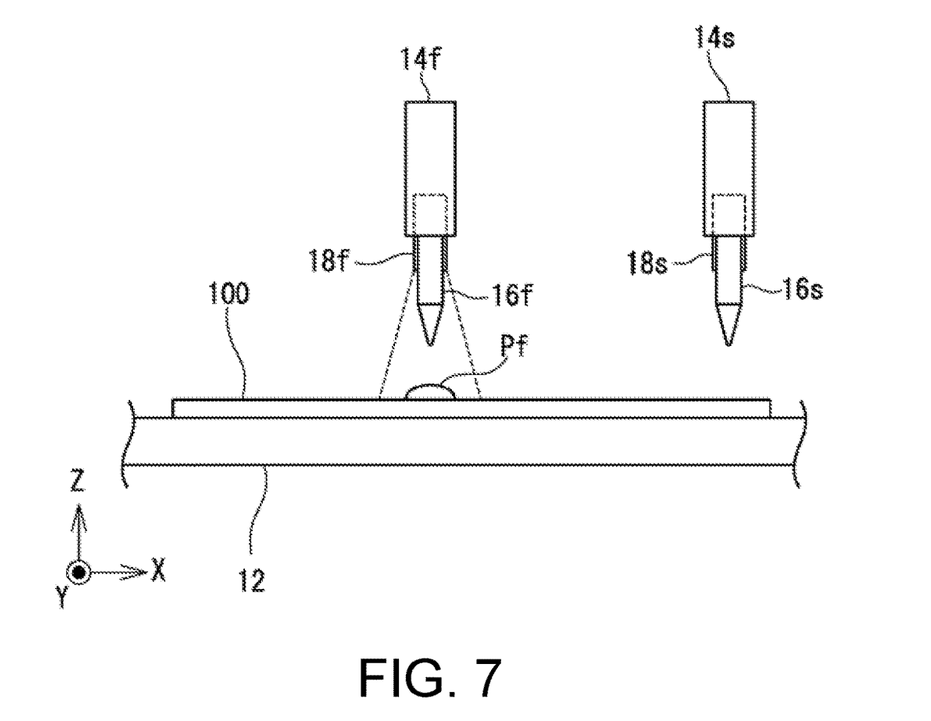
FIG. 7 is a conceptual diagram showing a flow of optical offset calculation processing.
Figure 8:
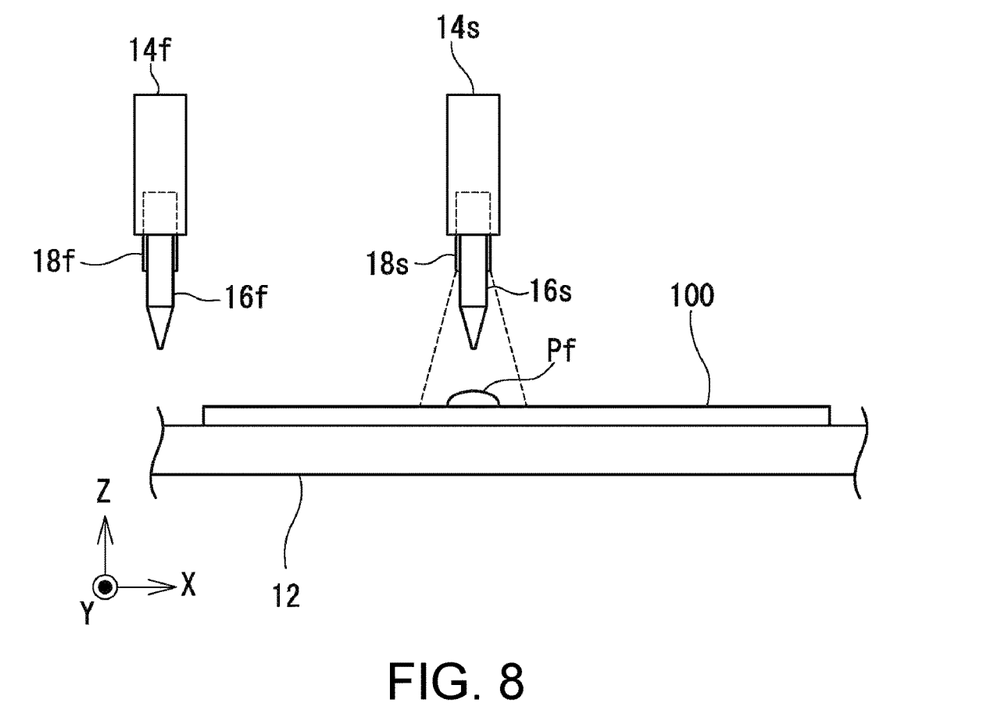
FIG. 8 is a conceptual diagram showing a flow of optical offset calculation processing.
Figure 9A:
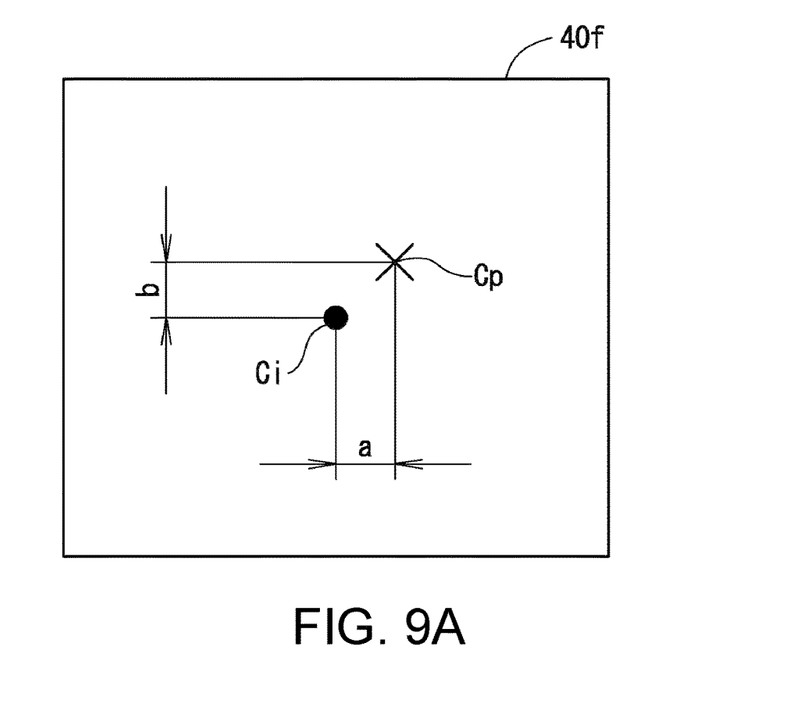
FIG. 9A is a conceptual diagram of a first optical inspection image.

Therefore, in this example, the optical offset OSo is also obtained before manufacture of the product is actually started. The acquisition of the optical offset OSo is described below. FIG. 7 and FIG. 8 are conceptual diagrams showing a flow of calculation processing of the optical offset OSo. In the case of obtaining the optical offset OSo, as shown in FIG. 7, the controller 30 instructs the first processing head 14f to perform paste coating on one island If. The one island If is an optical inspection part whose image is taken by both the first camera 18f and the second camera 18s. In the case where the first processing head 14f coats the paste Pf on one island If, the controller 30 causes an image to be taken of the coated paste Pf by the first camera 18*f*. The controller 30 acquires an image obtained by this image taking as a first optical inspection image 40*f*. FIG. 9A is a conceptual diagram of the first optical inspection image 40*f*. In FIG. 9A, a black circle indicates the island center point Ci, and a cross mark indicates a center point (hereinafter referred to as "paste center point Cp") of the paste Pf. As shown in the example of FIG. 9A, in the first optical inspection image 40*f*, in the first camera 18*f*, an image is obtained in which the paste center point Cp deviates from the island center point Ci by (a, b).

Figure 9B:
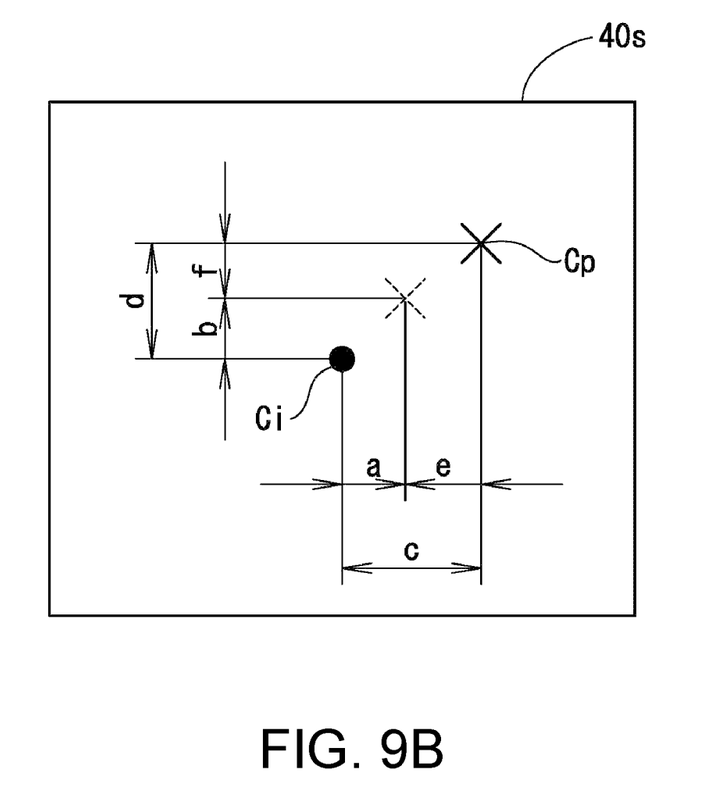
FIG. 9B is a conceptual diagram of a first optical inspection image.

Next, as shown in FIG. 8, the controller 30 causes the lead frame 100 to move in the X direction so that the island If being the optical inspection part is located within a field of view of the second camera 18*s*. Then, an image is taken of the optical inspection part by the second camera 18*s*, and the thus obtained image is acquired as a second optical inspection image 40*s*. The second optical inspection image 40*s* is taken of the same paste Pf as the first optical inspection image 40*f*. FIG. 9B is a diagram showing an example of the second optical inspection image 40*s*. In FIG. 9B, a cross mark in broken line indicates a position of (a, b) from the island center point Ci, that is, a position of the paste center point Cp calculated based on the first optical inspection image 40*f*.

As shown in FIG. 9B, in the second optical inspection image 40*s*, the paste Pf deviates from the island center point Ci by (c, d). That is, despite the fact that the images are taken of the same paste Pf, not only a deviation amount of the paste center point Cp with respect to the island center point Ci in the image but also the position of the paste Pf relative to the reference (the island If in this example) differs.

This is due to the difference in optical characteristics between the first camera 18*f* and the second camera 18*s*. In the example of FIG. 9B, the second camera 18*s* deviates by (e, f) as compared with the first camera 18*f* due to the difference in optical characteristics. Moreover, e=c−a and f=b−d.

The controller 30 acquires, as the optical offset OSo=(xo, yo), the difference (e, f) between the paste position obtained from the first camera 18*f* and the paste position obtained from the second camera 18*s*. That is, the difference is stored in the memory 34 that xo=e and yo=f. A value (−xo, −yo) that cancels out the optical offset OSo is stored in the memory 34 as a position correction value of the second processing head 14*s*. When the second processing head 14*s* is positioned, the value (−xo, −yo) that cancels out the optical offset OSo is added to the target position of the second processing head 14*s*. Accordingly, the positioning standard is consistent between the first processing head 14*f* and the second processing head 14*s*, and the relative positional relationship of the paste P coated on one lead frame 100 is close to an ideal value.

Figure 10:
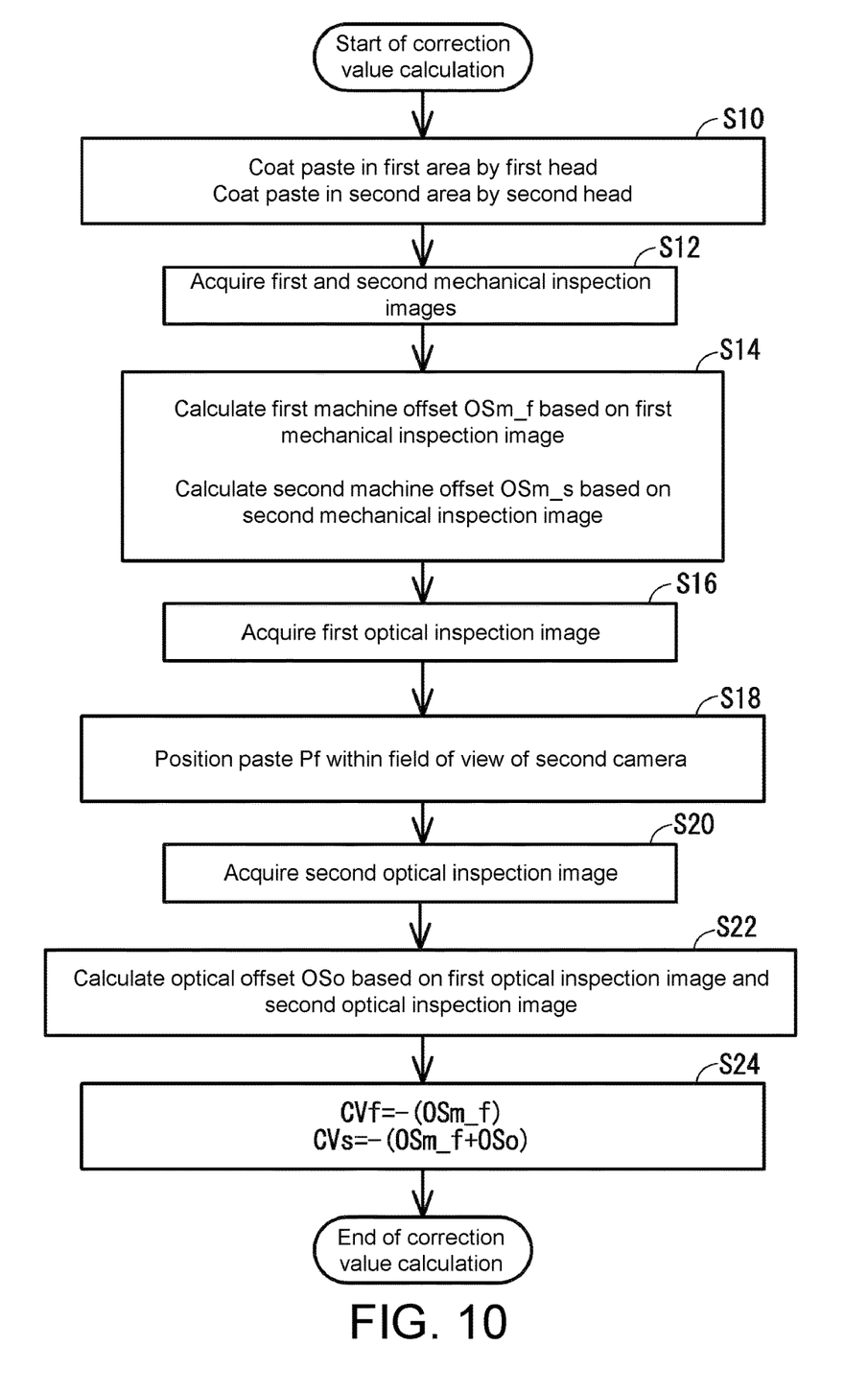
FIG. 10 is a flowchart showing a flow of calculation of a position correction value.

Next, a flow of calculating position correction values CVf and CVs respectively of the first processing head 14*f* and the second processing head 14*s* is described with reference to FIG. 10. FIG. 10 is a flowchart showing the flow of calculation of the position correction values CVf and CVs. When the position correction values CVf and CVs are calculated, first of all, the paste Pf is coated in the first area Af by the first processing head 14*f*, and the paste Ps is coated in the second area As by the second processing head 14*s* (S10). The pastes Pf and Ps may be coated on all the islands If and Is in the corresponding areas Af and As, or may only be coated on some of the islands If and Is.

Next, a first and second mechanical inspection image are acquired (S12). The first mechanical inspection image is an image obtained by taking an image of the paste Pf of the island If by the first camera 18*f*. Similarly, the second mechanical inspection image is an image obtained by taking an image of the paste Ps of the island Is by the second camera 18*s*.

The controller 30 calculates a machine offset of the first processing head 14*f*, that is, a first machine offset OSm_f, based on the first mechanical inspection image obtained. The controller 30 calculates a machine offset of the second processing head 14*s*, that is, a second machine offset OSm_s, based on the second mechanical inspection image obtained (S14).

Next, the controller 30 acquires the first optical inspection image 40*f* that is obtained by taking an image of the paste Pf of the island If by the first camera 18*f* (S16). The first optical inspection image 40*f* may be acquired by taking an image again, or one of the first mechanical inspection images may be acquired as the first optical inspection image 40*f*.

Subsequently, the controller 30 causes the lead frame 100 to move so that the paste Pf shown in the first optical inspection image 40*f* is located within the field of view of the second camera 18*s* (S18). Then, an image is taken of the paste Pf by the second camera 18*s*, and the second optical inspection image 40*s* is acquired (S20).

If the first optical inspection image 40*f* and the second optical inspection image 40*s* can be acquired, the controller 30 acquires the optical offset OSo (S22). That is, a difference between the relative positional relationship between the reference and the paste Pf obtained based on the first optical inspection image 40*f* and the relative positional relationship between the reference and the paste Pf obtained based on the second optical inspection image 40*s* is acquired as the optical offset OSo.

Then, the controller 30 calculates a value that cancels out the offset obtained as a position correction value (S24). That is, the controller 30 calculates a value that cancels out the first machine offset OSm_f as the first position correction value CVS=−(OSm_f). The controller 30 calculates a value that cancels out the second machine offset OSm_s and the optical offset OSo as the second position correction value CVs=−(OSm_s+OSo). When a product is manufactured, each processing head 14 is positioned at a position obtained by adding the position correction value to the target position.

As is clear from the above description, according to this example, an image is taken of a common object (paste Pf) by multiple cameras 18*f* and 18*s*, and the optical offset OSo is obtained based on a difference in the appearance of the object between the images obtained. Then, during product manufacturing, by positioning the processing head 14*s* at a position where the optical offset OSo is canceled out, positional variation between the processing heads 14 can be reduced, and the quality of the final product can be improved.

In the above description, an apparatus that coats the paste P as predetermined processing has been described as an example. However, the technique disclosed in the present specification may be applied to any other apparatus that processes one substrate by multiple heads. For example, the technique of the present specification may be applied to a bonding apparatus that bonds a chip to a substrate. That is, there is a bonding apparatus which includes multiple bonding heads therein and bonds a chip to a common substrate by the multiple bonding heads. The technique of the present specification may be applied to such a bonding apparatus.

In the above description, not only the relative positional relationship between the island I of the lead frame 100 as the reference and the paste Pf coated on the island I as the object but also the optical offset OSo is acquired. However, if an image is taken of the same object by the two cameras 18*f* and 18*s*, the object whose image is to be taken may be something else than the paste Pf. For example, an inspection station may be provided in the vicinity of the stage 12, and a reference serving as a standard and some kind of object may be provided in the inspection station. In this case, the controller 30 takes an image of the inspection station as the optical inspection part by the two cameras 18*f* and 18*s*. In the above description, two processing heads 14 are provided. However, the number of the processing head 14 may be two or more if processing is performed on one common substrate.

In the above description, the first camera 18*f* and the second camera 18*s* are fixed with respect to the conveyance direction. After an image is taken of the island Is by the first camera, the lead frame 100 is conveyed and an image is taken of the same island by the second camera. However, the first camera 18*f* and the second camera 18*s* may also be moved with respect to the lead frame 100 while an offset between the first camera 18*f* and the second camera 18*s* is maintained.

What is claimed is:

1. A manufacturing apparatus of a semiconductor device, comprising:
    a plurality of processing heads provided apart from each other in order to perform predetermined processing in different positions on a common substrate, wherein each of the plurality of processing heads comprises a camera taking an image of the substrate; and
    a controller controlling driving of the plurality of processing heads and conveyance of the substrate, wherein the controller positions each of the plurality of processing heads with respect to the substrate at a position where at least an optical offset due to a variation in optical characteristics between the plurality of cameras in the plurality of processing heads is canceled out, wherein
    the controller, before the positioning,
    takes an image of one optical inspection part comprising a reference and an object located apart from the reference by the camera of each of the plurality of processing heads and acquires an optical inspection image corresponding to each of the plurality of processing heads, and
    calculates, as the optical offset, an amount of difference between the processing heads in a relative positional relationship between the reference and the object shown in the optical inspection image.

2. The manufacturing apparatus of a semiconductor device according to claim 1, wherein
    the predetermined processing comprises processing for mounting the object on the substrate;
    the reference is a shape feature of a surface of the substrate;
    the controller
    before acquisition of the optical inspection image, causes one of the plurality of processing heads to execute the predetermined processing on a portion of the substrate, and
    causes an image to be taken of a part of the substrate where the object is mounted by the predetermined processing as the optical inspection part by the camera of each of the plurality of processing heads.

3. The manufacturing apparatus of a semiconductor device according to claim 1, wherein
    in the positioning, the controller positions each of the plurality of processing heads at a position where the optical offset and a machine offset are canceled out, and
    the controller, before the positioning,
    causes each of the plurality of processing heads to execute the predetermined processing in a corresponding area on the substrate,
    takes an image of the corresponding area on the substrate by the camera of each of the plurality of processing heads, and acquires a mechanical inspection image corresponding to each of the plurality of processing heads, and
    calculates the machine offset for each of the plurality of processing heads based on a relative positional relationship between the reference and the object shown in the mechanical inspection image.

4. The manufacturing apparatus of a semiconductor device according to claim 1, wherein
    the predetermined processing is processing for coating a paste as the object on the substrate.

5. A manufacturing method of a semiconductor device, comprising:
    acquiring an optical offset due to a variation in optical characteristics between each of a plurality of cameras corresponding to each of a plurality of processing heads provided apart from each other in order to perform predetermined processing in different positions on a common substrate; and
    positioning each of the plurality of processing heads with respect to the substrate at a position where at least the optical offset is canceled out, and causing each of the plurality of processing heads to execute the predetermined processing in a corresponding position on the substrate;
    wherein the acquiring comprises:
    taking an image of one optical inspection part comprising a reference and an object located apart from the reference by a camera provided on each of the plurality of processing heads and acquiring an optical inspection image corresponding to each of the plurality of processing heads; and
    calculating, as the optical offset, an amount of difference between the processing heads in a relative positional relationship between the reference and the object shown in the optical inspection image.

6. The manufacturing apparatus of a semiconductor device according to claim 2, wherein
    in the positioning, the controller positions each of the plurality of processing heads at a position where the optical offset and a machine offset are canceled out, and
    the controller, before the positioning,
    causes each of the plurality of processing heads to execute the predetermined processing in a corresponding area on the substrate,
    takes an image of the corresponding area on the substrate by the camera of each of the plurality of processing heads, and acquires a mechanical inspection image corresponding to each of the plurality of processing heads, and
    calculates the machine offset for each of the plurality of processing heads based on a relative positional relationship between the reference and the object shown in the mechanical inspection image.

* * * * *